US010991975B2

(12) United States Patent
Seong et al.

(10) Patent No.: US 10,991,975 B2
(45) Date of Patent: Apr. 27, 2021

(54) METHOD OF MANUFACTURING SULFIDE-BASED SOLID ELECTROLYTE FOR ALL-SOLID BATTERY

(71) Applicants: Hyundai Motor Company, Seoul (KR); Kia Motors Corporation, Seoul (KR); Industry-University Cooperation Foundation Hanyang University, Seoul (KR)

(72) Inventors: Ju Yeong Seong, Gyeonggi-do (KR); Hong Seok Min, Gyeonggi-do (KR); Yong Jun Jang, Gyeonggi-do (KR); Yong Sub Yoon, Seoul (KR); Pil Gun Oh, Seoul (KR); Dong Wook Shin, Gyeonggi-do (KR); Sun Ho Choi, Incheon (KR); Jong Yeob Park, Seoul (KR)

(73) Assignees: Hyundai Motor Company, Seoul (KR); Kia Motors Corporation, Seoul (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 135 days.

(21) Appl. No.: 16/210,725

(22) Filed: Dec. 5, 2018

(65) Prior Publication Data
US 2019/0326627 A1  Oct. 24, 2019

(30) Foreign Application Priority Data

Apr. 18, 2018  (KR) .................. 10-2018-0045017

(51) Int. Cl.
*H01M 10/0562* (2010.01)
*H01M 10/0525* (2010.01)
*H01M 10/058* (2010.01)

(52) U.S. Cl.
CPC ..... *H01M 10/0562* (2013.01); *H01M 10/058* (2013.01); *H01M 10/0525* (2013.01); *H01M 2220/20* (2013.01); *H01M 2300/0068* (2013.01)

(58) Field of Classification Search
CPC ........... H01M 10/0562; H01M 10/058; H01M 10/0525; H01M 2220/20; H01M 2300/0068; H01M 10/052; H01M 2300/0091; C01B 17/22; H01B 1/10
See application file for complete search history.

(56) References Cited

U.S. PATENT DOCUMENTS

| 2001/0023237 | A1* | 9/2001 | Bijl | ........................... D06L 4/13 |
| | | | | 510/367 |
| 2003/0080028 | A1* | 5/2003 | Tian | ........................ C10G 21/27 |
| | | | | 208/313 |
| 2010/0288360 | A1* | 11/2010 | Kawasaki | ............. C09B 23/148 |
| | | | | 136/261 |
| 2011/0143211 | A1* | 6/2011 | Takeyama | .............. G02F 1/1525 |
| | | | | 429/302 |
| 2016/0104916 | A1* | 4/2016 | Seino | ........................ H01B 1/10 |
| | | | | 429/189 |
| 2019/0312304 | A1* | 10/2019 | Uesugi | ................. H01M 10/052 |
| 2019/0386322 | A1* | 12/2019 | Yawata | .................... H01M 6/18 |

FOREIGN PATENT DOCUMENTS

| JP | 3284215 B2 | 5/2002 |
| JP | 2016-213006 A | 12/2016 |
| KR | 20150138723 A | 12/2015 |
| KR | 101807583 B1 | 12/2017 |
| WO | 2014174829 A1 | 10/2014 |

\* cited by examiner

*Primary Examiner* — Muhammad S Siddiquee
(74) *Attorney, Agent, or Firm* — Mintz Levin Cohn Ferris Glovsky and Popeo, P.C.; Peter F. Corless

(57) ABSTRACT

Disclosed is a method of manufacturing a solid electrolyte for an all-solid battery. The method may include preparing a solvent admixture comprising a first polar organic solvent containing a cyano group and a second polar organic solvent containing a hydroxyl group, preparing an electrolyte admixture by dissolving $Li_2S$, $P_2S_5$ and LiCl in the solvent admixture, and preparing a solid electrolyte by stirring the electrolyte admixture. The method may further include precipitating the solid electrolyte by evaporating the solvent admixture, and heat treating the precipitated solid electrolyte. In particular, the solvent admixture may include the second polar organic solvent in an amount of about 0.01 to 0.03 wt % based on the total weight of the first polar organic solvent.

19 Claims, 16 Drawing Sheets

METHOD OF MANUFACTURING SULFIDE-BASED SOLID ELECTROLYTE FOR ALL-SOLID BATTERY

CROSS-REFERENCE TO RELATED APPLICATION

This application claims, under 35 U.S.C. § 119(a), the benefit of priority to Korean Patent Application No. 10-2018-0045017, filed Apr. 18, 2018, the entire contents of which is incorporated herein for all purposes by reference.

TECHNICAL FIELD

The present invention relates to a method of manufacturing a solid electrolyte for an all-solid battery, which may have high ionic conductivity and is chemically and electrochemically stable.

BACKGROUND OF THE INVENTION

As smart phones and small electronic devices have been widely used, lithium secondary batteries as small power sources thereof have been increasingly developed, and with the development of electric vehicles, the demand for lithium secondary batteries has been further increasing.

A lithium secondary battery includes a cathode and an anode, which may send and receive lithium ions, and an electrolyte responsible for the transport of lithium ions. A typical lithium secondary battery includes a liquid electrolyte comprising a lithium salt dissolved in an organic solvent, with a separator formed of organic fibers for preventing physical contact between the cathode and the anode in order to prevent a short circuit. Since the organic solvent, which is flammable, is used as the electrolyte solvent, in the event of a short circuit due to physical damage, there is a high likelihood of fire and explosion, and accidents frequently may occur.

An all-solid battery includes an inorganic solid electrolyte which replaces the flammable liquid electrolyte. The material of an inorganic solid electrolyte, which is the key element of the all-solid battery, mainly includes an oxide and a sulfide. In particular, a sulfide-based solid electrolyte has ionic conductivity as high as that of the liquid electrolyte, and may be the most promising solid electrolyte.

Recently, in the related art, a method of synthesizing a sulfide-based solid electrolyte by reacting $Li_2S$ with $P_2S_5$ in a polar organic solvent has been devised as a mass production process for synthesizing a sulfide-based solid electrolyte. For example, a sulfide-based solid electrolyte may be synthesized through the dissolution and precipitation of a starting material in the polar organic solvent. Although the properties of the solid electrolyte may deteriorate due to the remaining organic solvent, uniform and fine solid electrolytes may be obtained and mass production thereof may be ensured.

However, the solid electrolyte prepared through the above method is problematic. For example, because $Li_2S$ is excessively contained therein in order to increase ionic conductivity, a large amount of $Li_2S$ remaining in the final product may react with water, or the electrochemical stability with lithium may deteriorate. The dissolution precipitation process may not be easy to use to remove impurities due to organic remnants or $Li_2S$, which has low solubility. Accordingly, ionic conductivity or chemical stability may decrease due to the amount of remaining $Li_2S$.

SUMMARY OF THE INVENTION

In preferred aspects, the present invention provides a method of manufacturing a sulfide-based solid electrolyte for an all-solid battery, which has high ionic conductivity and is chemically and electrochemically stable.

For example, although the sulfide-based solid electrolyte of the present invention may include the amount of remaining $Li_2S$, $Li_6PS_5X$ (X=Cl, Br, I) with argyrodite structure included in the solid electrolyte may have rather high lithium ion conductivity of $10^{-2}$ to $10^{-3}$ S·cm−1 at room temperature.

The method also includes synthesizing the solid electrolyte via liquid phase process.

In one aspect, provided is a method of manufacturing a solid electrolyte ("sulfide-based solid electrolyte") for an all-solid battery. The method may include: preparing a solvent admixture including a first polar organic solvent and a second polar organic solvent, and preparing an electrolyte admixture including $Li_2S$ and $P_2S_5$ and the solvent admixture, preparing a solid electrolyte from the electrolyte admixture.

The method may further include precipitating the solid electrolyte; and heat treating the precipitated solid electrolyte.

The term "all-solid cell" or "all-solid battery" as used herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component.

Preferably, the first polar organic solvent may include a compound containing a cyano group, and the second polar organic solvent may include a compound containing a hydroxyl group. Preferably, the first polar organic solvent may be different from the second polar organic solvent.

The solvent admixture may suitably include the second polar organic solvent in an amount of about 0.01 to 0.03 parts by weight based on the total weight of the first polar organic solvent.

The electrolyte admixture may be prepared by dissolving the $Li_2S$ and $P_2S_5$ in the solvent admixture.

The electrolyte admixture may be stirred in preparing the solid electrolyte.

The solid electrolyte may be precipitated by evaporating the solvent admixture. For example, the remaining solvent admixture in the solid electrolyte may be less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, less than about 1 wt %, less than about 0.5 wt %, or less than about 0.1 wt %.

The solid electrolyte may emit an amount of about 0.25 to 0.4 $cm^3$/g of $H_2S$ gas upon exposure to air.

In the heat treating the sulfide-based solid electrolyte, the sulfide-based solid electrolyte may have an amorphous structure or an argyrodite-type crystal structure.

The term "argyrodite" or "argyrodite-type crystal structure" as used herein refers to an orthorhombic crystal structure similar to similar to naturally existing $Ag_8GeS_6$ (Argyrodite). For example, the argyrodite crystal may be orthorhombic having $Pna2_1$ space group and having a unit cell of a=15.149, b=7.476, c=10.589 [Å]; Z=4. The argyrodite crystal also may empirically be determined for example, by X-ray diffraction spectroscopy by observing peaks around at 2θ=15.5±1°, 18±1°, 26±1°, 30.5±1°, and 32±1°.

In the heat treating the sulfide-based solid electrolyte, the sulfide-based solid electrolyte may include a metal oxide.

The "metal oxide" as used herein refers to a compound including at least one or more metal components (e.g., Li, Na, Mg, and the like) and oxygen atoms, which may be directly bonded or indirectly bonded to each other. The metal oxide may further include other non-metallic components such as S, P, N, C, or the like.

The first polar organic solvent may suitably include acetonitrile. The second polar organic solvent may suitably include one or more selected from the group consisting of methanol, ethanol, and 1-propanol.

The solvent admixture may be prepared by stirring at a rotating speed of about 100 to 200 rpm for about 5 to 60 min.

The solid electrolyte may be prepared by stirring the electrolyte admixture at a temperature of about 30 to 60° C. for about 1 hr to 48 hr.

The method may include, in the preparing the solid electrolyte, primarily stirring the electrolyte admixture and secondarily stirring the primarily stirred electrolyte admixture. For example, the primarily stirring may be performed at a rotating speed of about 100 to 150 rpm for about 5 to 10 min.

The secondarily stirring may be performed at a rotating speed of about 250 to 300 rpm for about 18 to 36 hr.

The precipitating the sulfide-based solid electrolyte may be performed by evaporating the solvent admixture through drying in a vacuum in a temperature range from room temperature to a about 80° C. for about 1 hr to 24 hr.

In another aspect, provided is a solid electrolyte that may be manufactured by the method described herein.

Further provided is an all-solid battery that may include the solid electrolyte as described herein.

Also provided is a vehicle that may include the all-solid battery as described herein.

Other aspects of the invention are disclosed infra.

According to various exemplary embodiments of the present invention, a method of manufacturing a sulfide-based solid electrolyte for an all-solid battery may provide a sulfide-based solid electrolyte for an all-solid battery that has high ionic conductivity and is chemically and electrochemically stable.

DETAILED DESCRIPTION

Figure 1:
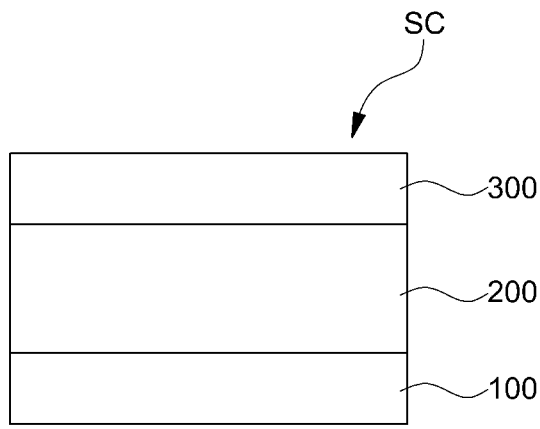
FIG. 1 is a cross-sectional view schematically showing an all-solid battery.

The above and other aspects, features and advantages of the present invention will be more clearly understood from the following preferred embodiments taken in conjunction with the accompanying drawings. However, the present invention is not limited to the embodiments disclosed herein, and may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a "first" element discussed below could be termed a "second" element without departing from the scope of the present invention. Similarly, the "second" element could also be termed a "first" element. As used herein, the singular forms are intended to include the plural forms as well, unless the context clearly indicates otherwise.

It will be further understood that the terms "comprise", "include", "have", etc. when used in this specification, specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between the valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like and up to 30%, and will also be understood to include any value between the valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a detailed description will be given of a method of manufacturing an exemplary sulfide-based solid electrolyte for an exemplary all-solid battery according to an exemplary embodiment of the present invention.

FIG. 1 is a cross-sectional view schematically showing an all-solid battery.

As shown in FIG. 1, the all-solid battery (SC) includes a cathode 100, a solid electrolyte 200 and an anode 300. An electrochemical reaction occurs in the all-solid battery (SC). When an electrochemical reaction occurs at electrodes, lithium ions are transferred between the cathode and the anode through the electrolyte, and simultaneously, electron transfer occurs between two electrodes through an electric line. Here, electrons are transferred along an external electric line that connects the two electrodes. At the anode, electrochemical oxidation of the electrode material occurs during the discharge of a battery, and this electrode is referred to as an oxidation electrode. At the cathode, the reduction reaction of the electrode material occurs by the electrons transferred from the anode through the external circuit during the discharge of a battery, and this electrode is referred to as a reduction electrode. Here, the solid electrolyte functions as an ion conductor that transfers ions between the two electrodes, and exhibits only ionic conductivity, without conductivity to electrons. The solid electrolyte 200 is provided between the cathode 100 and the anode 300. The anode 300 is provided on the solid electrolyte 200. The solid electrolyte 200 comes into contact with the cathode 100 and the anode 300.

The all-solid battery (SC) may be used as an energy source for a vehicle as described above. For example, the term "vehicle" indicates means for transporting goods, persons, or the like. Examples of the vehicle include land vehicles, marine vehicles and airborne vehicles. The land vehicles may include, for example, cars, including automobiles, vans, trucks, trailer trucks and sports cars, bicycles, motorcycles, trains, etc. The marine vehicles may include, for example, ships, submarines, and the like. The airborne vehicles may include, for example, airplanes, hang gliders, hot-air balloons, helicopters, and small flying bodies, such as drones, etc.

The solid electrolyte may be a sulfide-based solid electrolyte. For instance, "$Li_2S$—$P_2S_5$" may be a compound including a compound corresponding to $Li_7PS_6$ or including a derivative such as LiCl, LiBr, or LiI. The term "derivative" refers to a compound modified from a parent compound through the introduction of a functional group, oxidation, reduction, substitution of an atom, and the like within the range in which the structure and properties of the parent compound are not changed.

Figure 2:
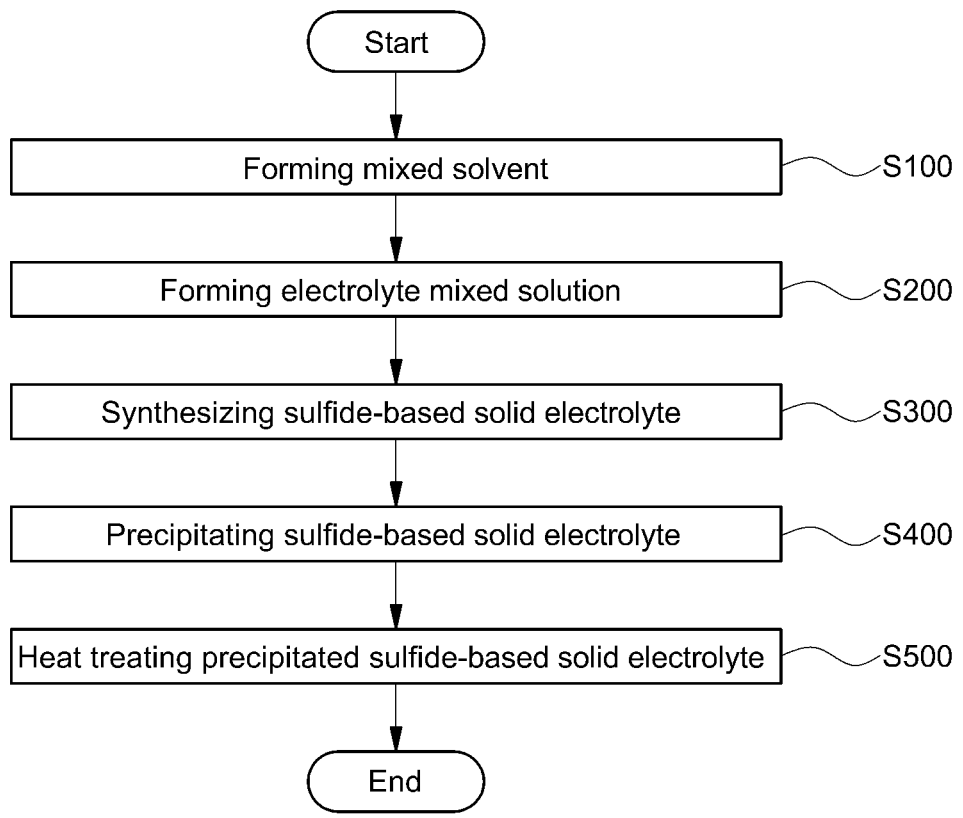
FIG. 2 is a flowchart schematically showing an exemplary process of manufacturing an exemplary sulfide-based solid electrolyte for an exemplary all-solid battery according to an exemplary embodiment of the present invention.
Figure 3A:
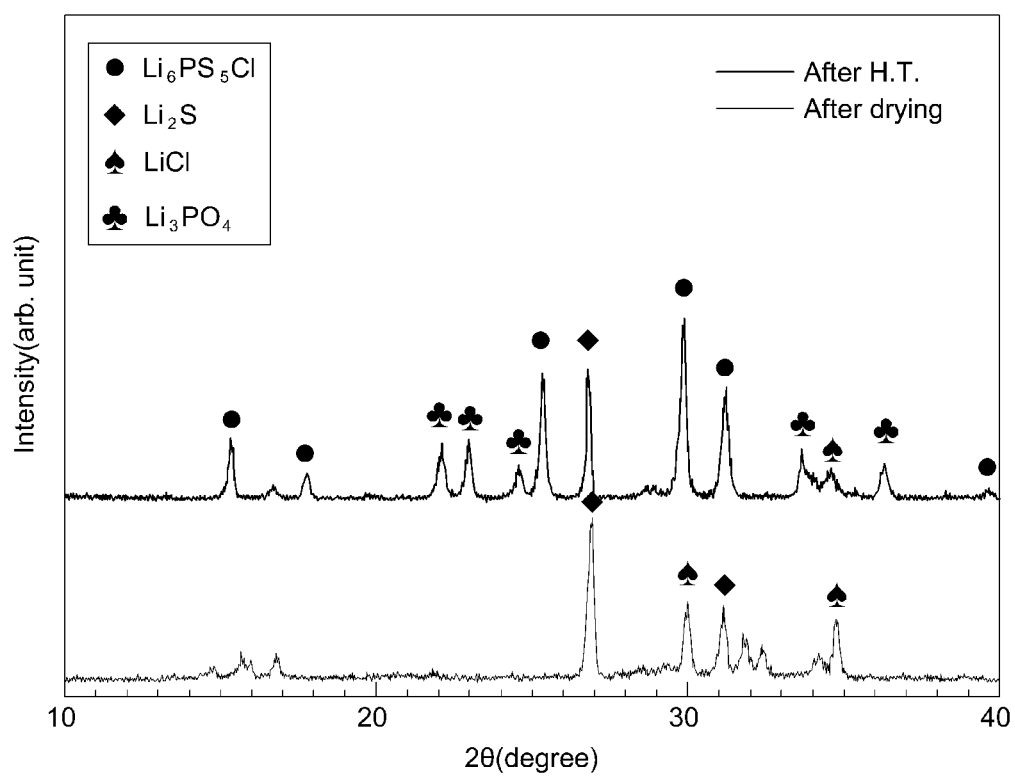
FIGS. 3A, 3B, 3C, 3D, 3E, 3F, 3G, 3H, 3I, 3J, and 3K are graphs showing the results of XRD of Example 1, Example 2, Comparative Example 1, Comparative Example 2, Comparative Example 3, Comparative Example 4, Comparative Example 5, Comparative Example 6, Comparative Example 7, Comparative Example 8, and Comparative Example 9, respectively.
Figure 3B:
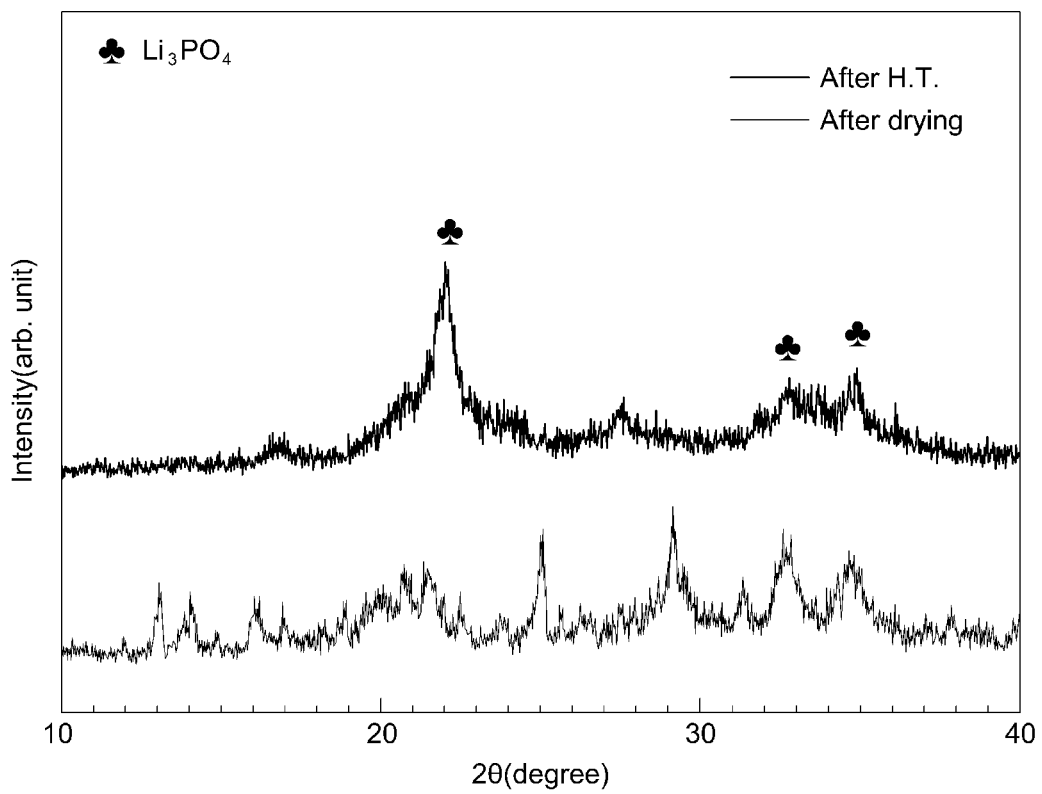
Figure 3C:
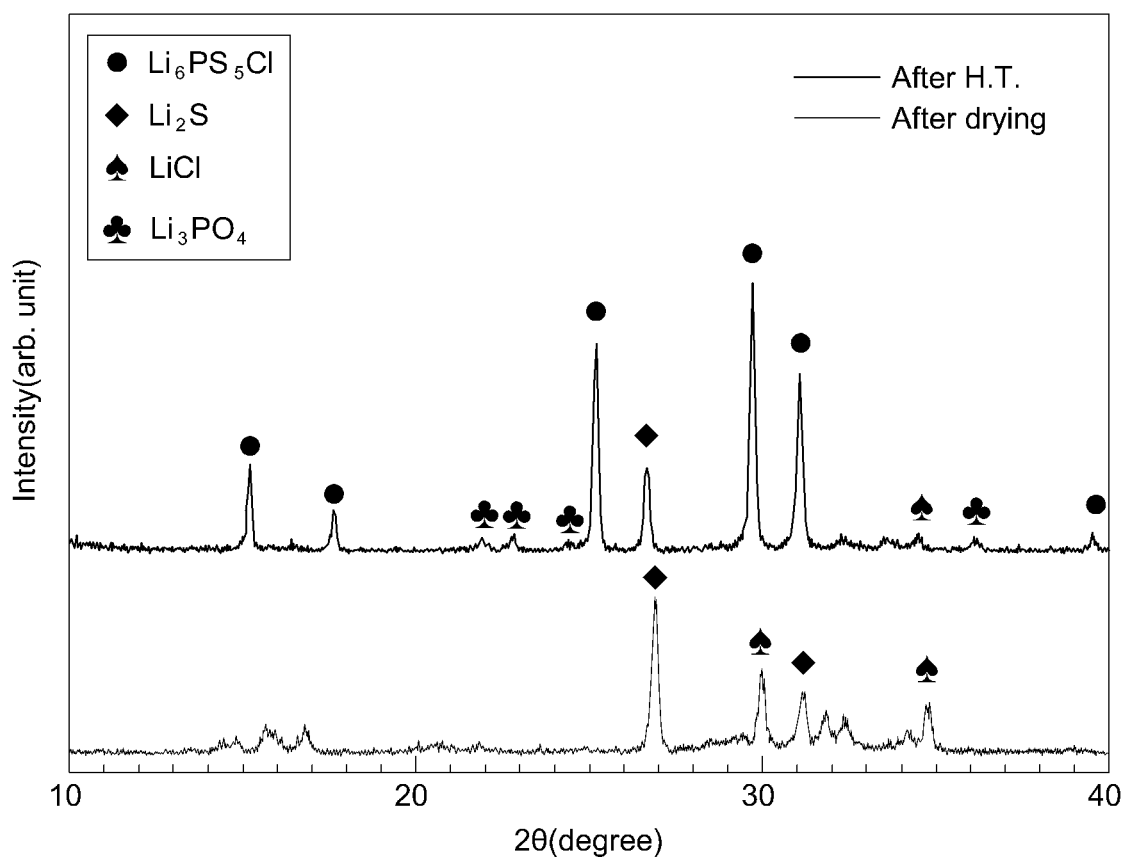
Figure 3D:
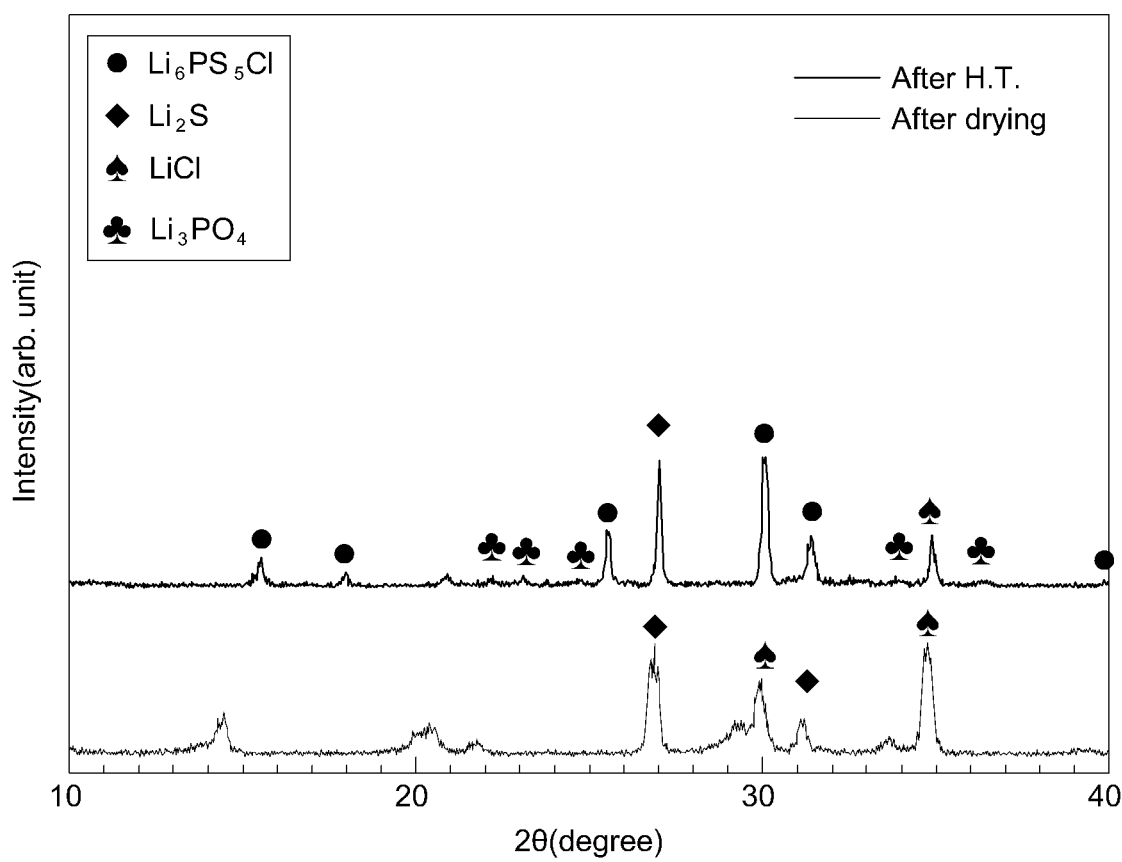
Figure 3E:
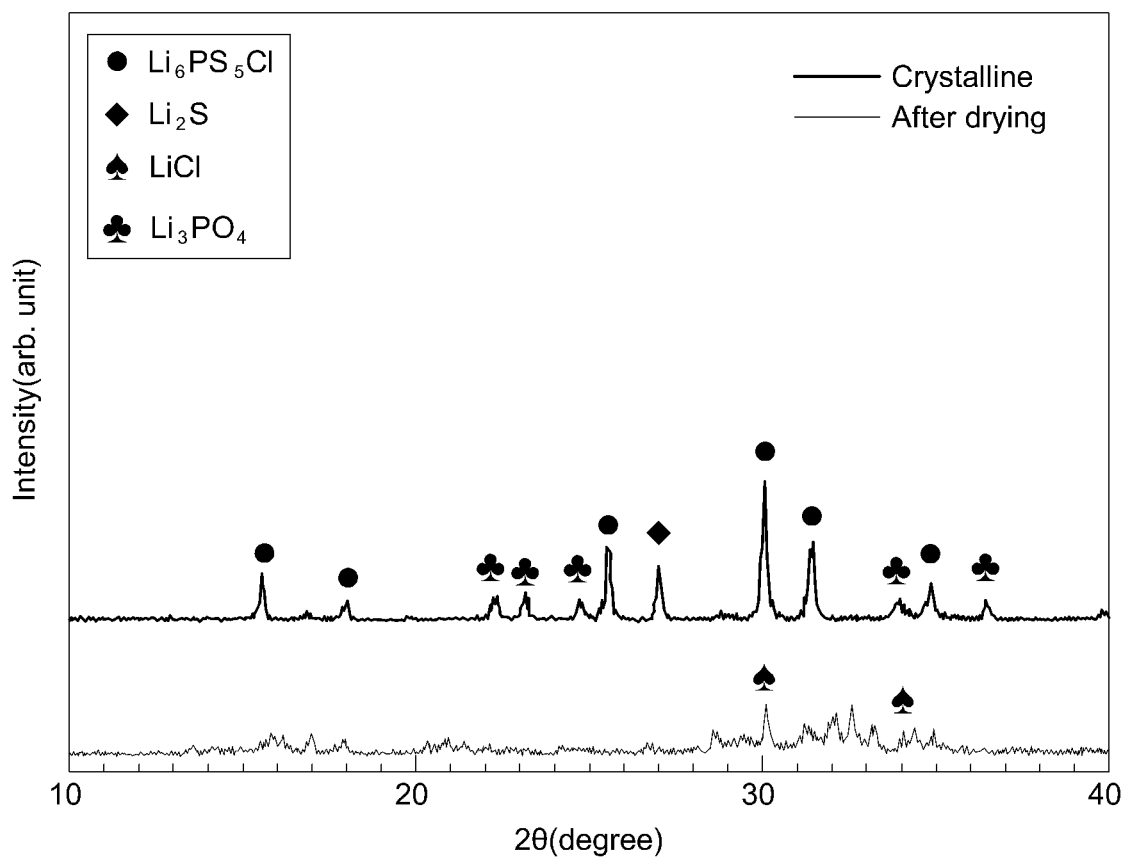
Figure 3F:
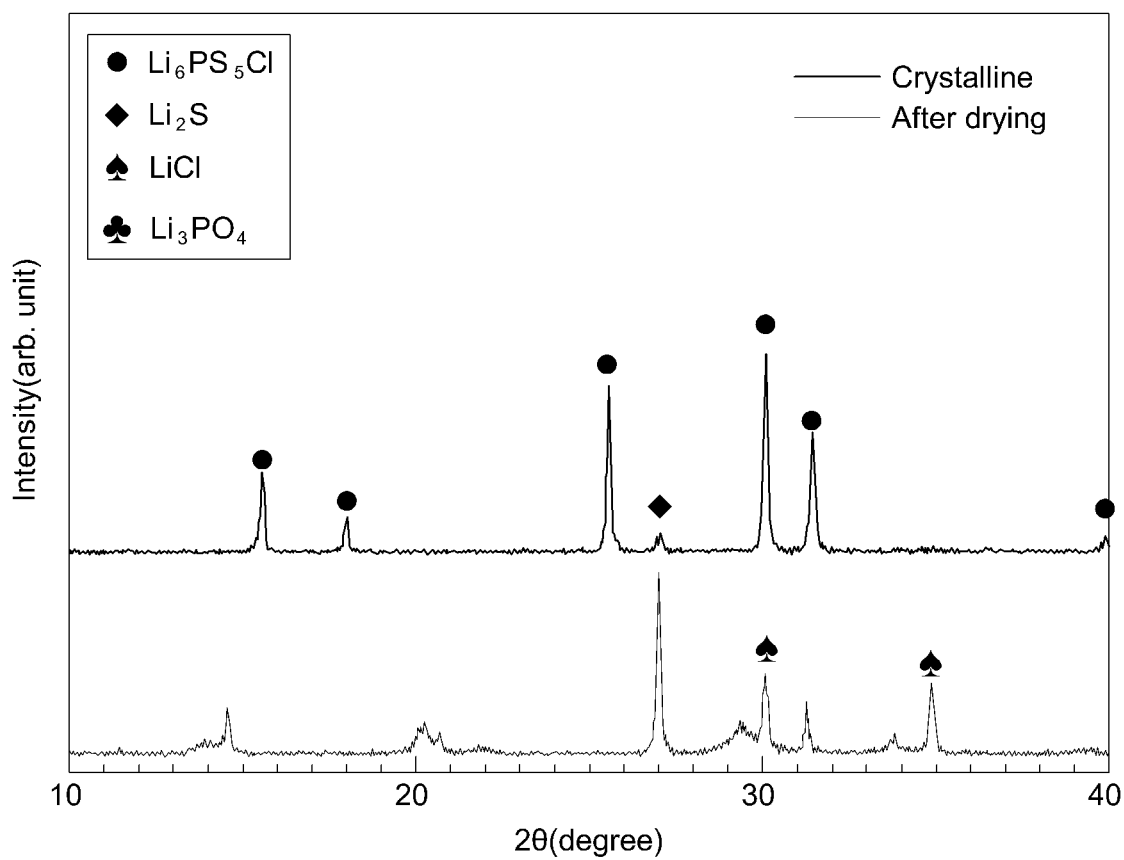
Figure 3G:
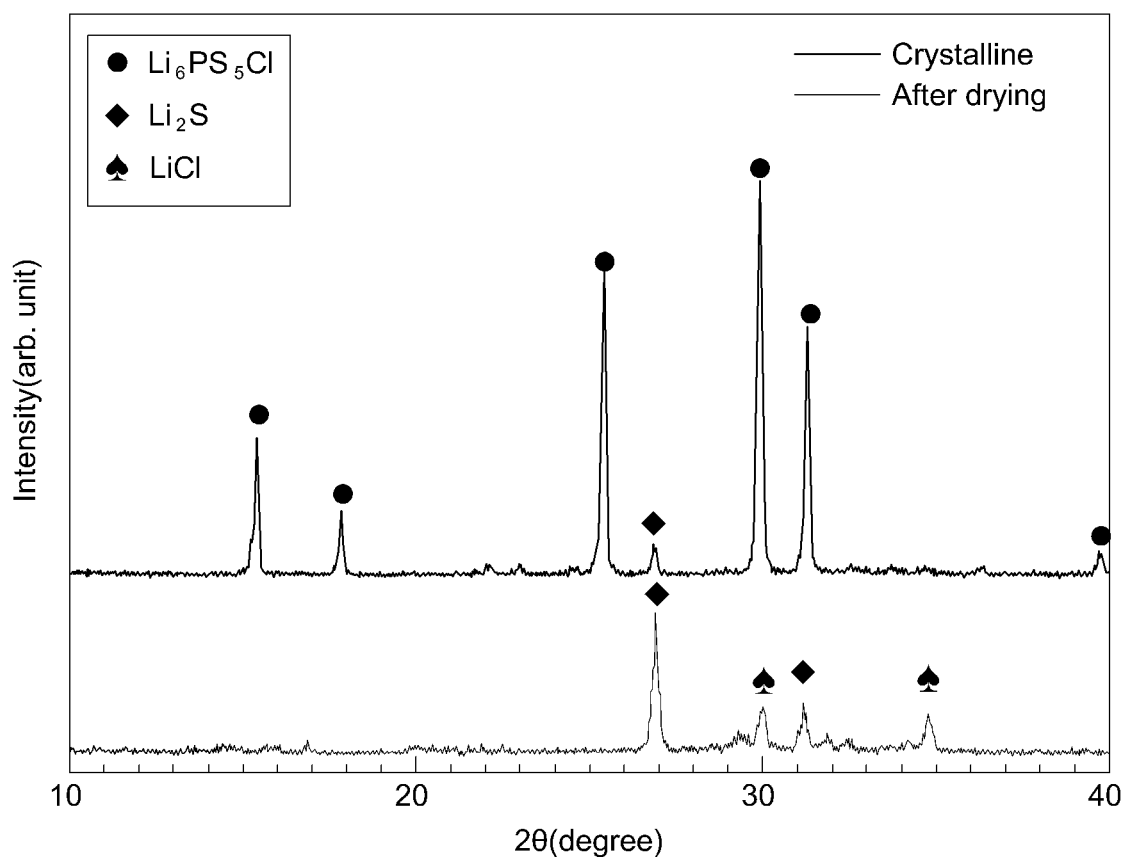
Figure 3H:
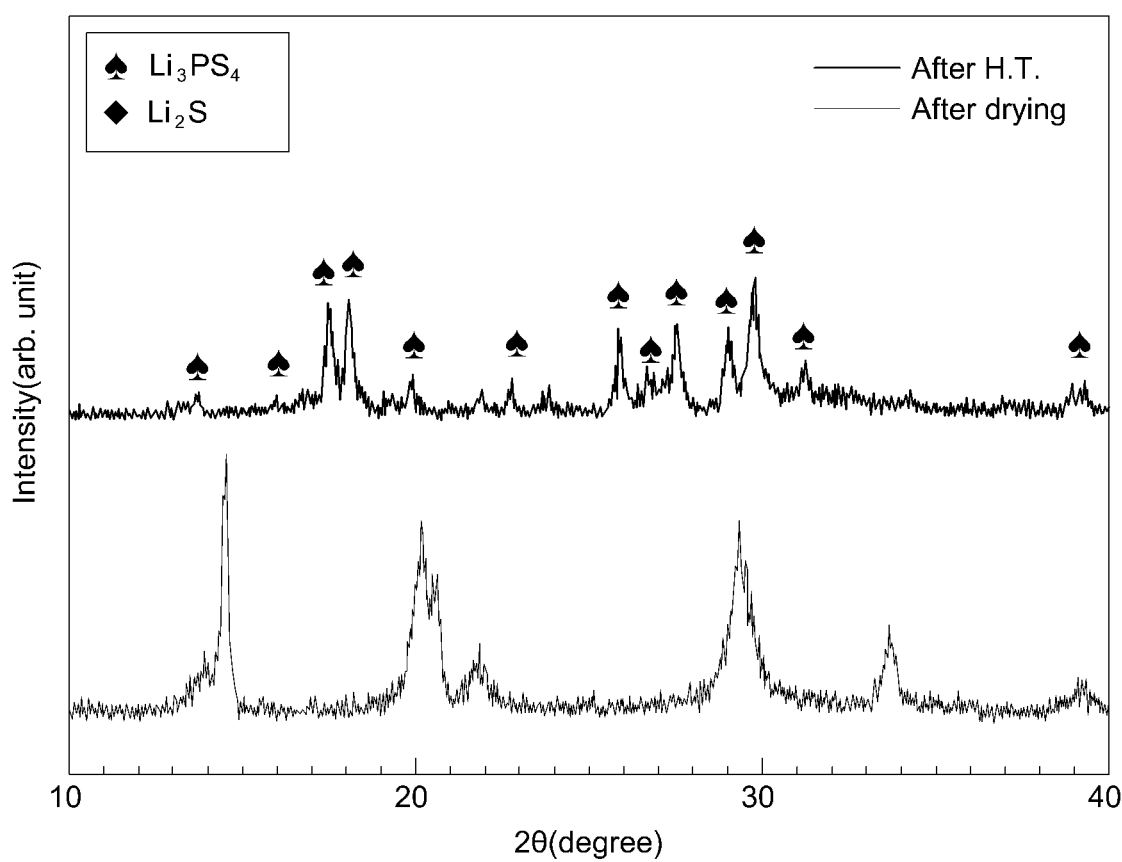
Figure 3I:
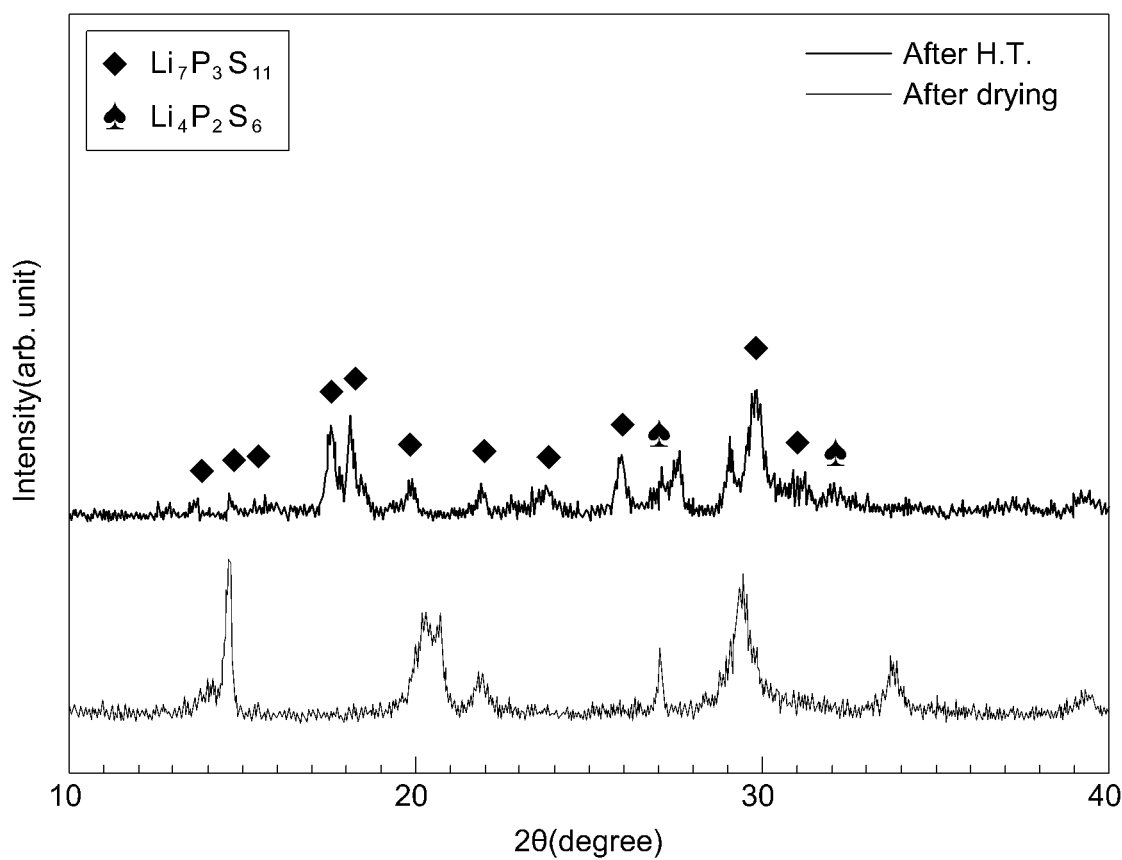
Figure 3J:
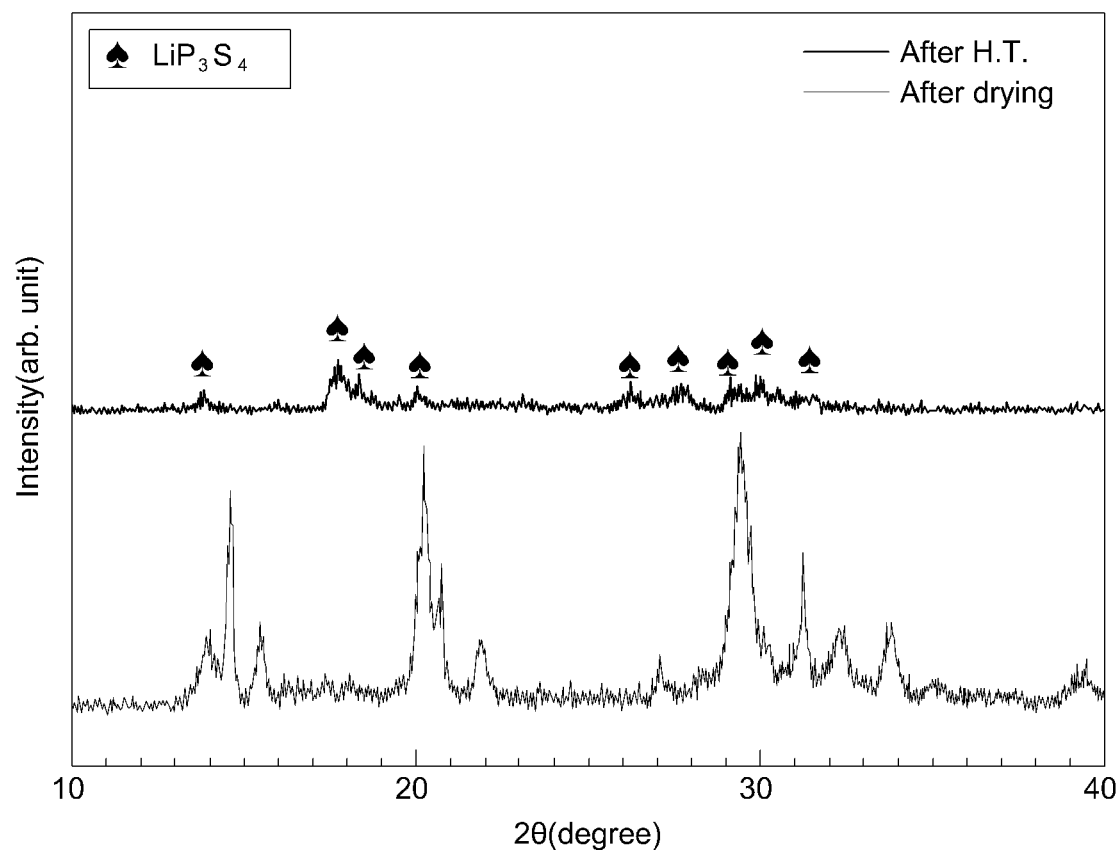
Figure 3K:
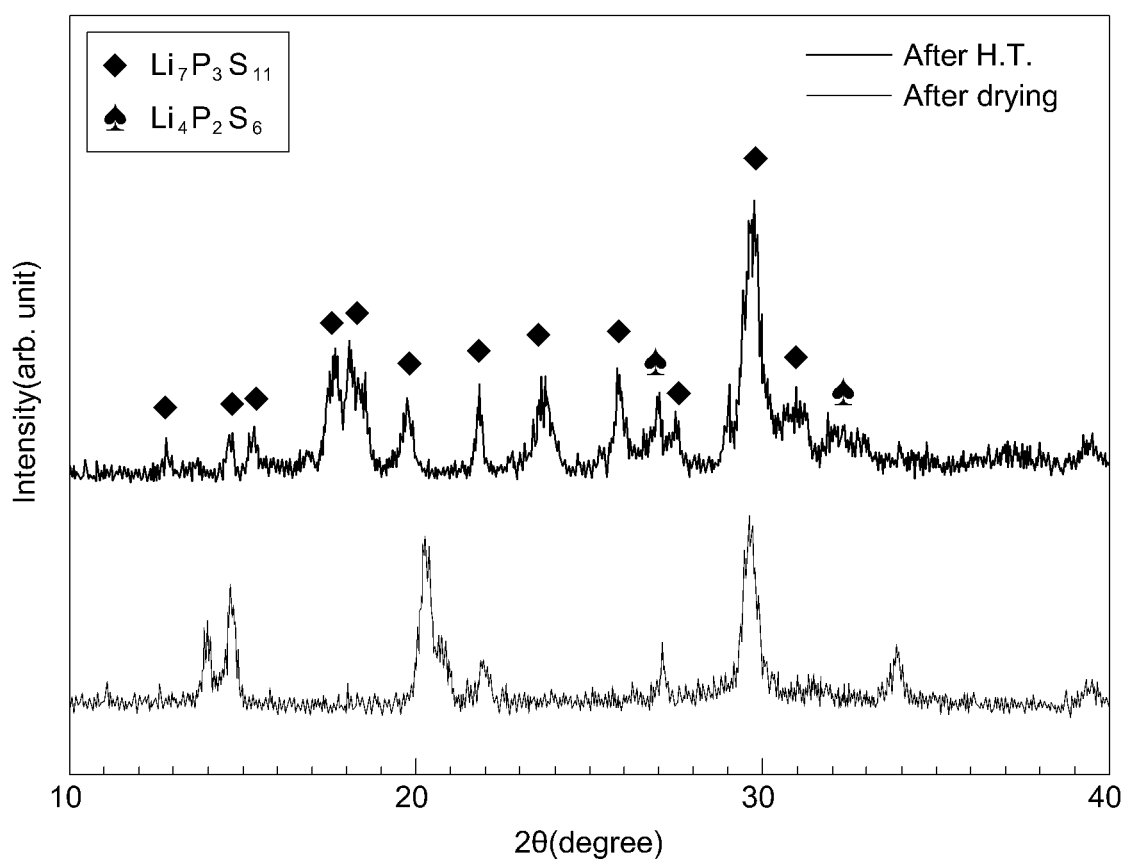

FIG. 2 is a flowchart schematically showing an exemplary process of manufacturing a sulfide-based solid electrolyte for an all-solid battery according to an exemplary embodiment of the present invention.

A sulfide-based solid electrolyte, obtained by the method of manufacturing a sulfide-based solid electrolyte for an all-solid battery according to an exemplary embodiment of the present invention, may be used as the solid electrolyte 200 for an all-solid battery (SC) of FIG. 1.

As shown in FIG. 2, the method of manufacturing a sulfide-based solid electrolyte for an all-solid battery according to an embodiment of the present invention includes the steps of forming a solvent admixture by adding a first polar organic solvent with a second polar organic solvent (S100), forming an electrolyte admixture by dissolving $Li_2S$ and $P_2S_5$ in the solvent admixture (S200), synthesizing a sulfide-based solid electrolyte by stirring the electrolyte admixture (S300), precipitating the sulfide-based solid electrolyte by evaporating the solvent admixture (S400), and heat treating the precipitated sulfide-based solid electrolyte (S500).

The first polar organic solvent which is a compound containing a cyano group may be prepared. The first polar organic solvent may include, for example, acetonitrile. The first polar organic solvent may be acetonitrile. The first polar organic solvent may be different from the second polar organic solvent.

The solvent admixture including the first polar organic solvent with the second polar organic solvent may be prepared by adding the first polar organic solvent with the second polar organic solvent (S100). In the step of forming the solvent admixture (S100), the second polar organic solvent may be a compound containing a hydroxyl group, and may suitably include one or more selected from the group consisting of, for example, methanol, ethanol, and 1-propanol.

In the step of forming the solvent admixture (S100), the second polar organic solvent may be added in an amount of about 0.01 to 0.03 parts by weight based on the amount of the first polar organic solvent. When the amount thereof is less than about 0.01 parts by weight, the amount of the second polar organic solvent may be reduced, and thus the effect of addition thereof may be insignificant. When the amount thereof is greater than about 0.03 parts by weight, the sulfide-based solid electrolyte may not sufficiently contain an oxide, and thus non-uniform mixing may result. When the second polar organic solvent is used as the main solvent, in lieu of the first polar organic solvent, the second polar organic solvent may react with $P_2S_5$ to thus destroy the crystal structure of the solid electrolyte, undesirably deteriorating ionic conductivity.

The step of forming the solvent admixture (S100) may be performed by stirring the solvent admixture at a rotating speed of about 100 to 200 rpm for about 5 to 60 min. When the step of forming the solvent admixture (S100) is performed under processing conditions that fall below the respective lower limits of the above ranges, the first polar organic solvent and the second polar organic solvent may not be sufficiently mixed. When this process is performed under processing conditions greater the respective upper limits of the above ranges, non-uniform mixing may result.

The electrolyte admixture including $Li_2S$, $P_2S_5$ and the solvent admixture may be formed by dissolving $Li_2S$ and $P_2S_5$ in the solvent admixture (S200). In the step of forming the electrolyte admixture (S200), metal halide compound (e.g., LiBr, LiCl or the like) may be further dissolved. For example, in the step of forming the electrolyte admixture (S200), when $Li_2S$ and $P_2S_5$ are dissolved, a sulfide-based solid electrolyte having an amorphous structure may be obtained. For example, when an amount of about 70 mol % of $Li_2S$ and an amount of about 30 mol % of $P_2S_5$ are dissolved, a $70Li_2S-30P_2S_5$ solid electrolyte having an amorphous structure may be obtained. The amorphous structure, which is non-crystalline or amorphous, may refer to a structure in which there is no long-range order at the location of atoms.

For example, in the step of forming the electrolyte admixture (S200), when $Li_2S$, $P_2S_5$, and LiCl are dissolved, a sulfide-based solid electrolyte having an argyrodite-type crystal structure may be obtained. The argyrodite type may refer to a crystal phase. The sulfide-based solid electrolyte having an argyrodite-type crystal structure may representatively include $Li_6PS_5Cl$ and $Li_7PS_6$.

The sulfide-based solid electrolyte is synthesized by stirring the electrolyte admixture (S300). The step of synthesizing the sulfide-based solid electrolyte (S300) may be performed by stirring the electrolyte admixture at a temperature of about 30 to 80° C. for about 1 hr to 48 hr. When this process is performed under processing conditions that fall below the respective lower limits of the above ranges, the sulfide-based solid electrolyte may not be sufficiently synthesized. When this process is performed under processing conditions exceeding the respective upper limits of the above ranges, side reactions may occur, making it impossible to obtain a solid electrolyte having high ionic conductivity.

The step of synthesizing the sulfide-based solid electrolyte (S300) may include primarily stirring the electrolyte admixture and secondarily stirring the primarily stirred electrolyte admixture. The primarily stirring may be carried out at a rotating speed of about 100 to 150 rpm for about 5 to 10 min. When this process is performed under processing conditions that fall below the respective lower limits of the above ranges, it is difficult to uniformly mix $Li_2S$ and $P_2S_5$ in the solvent admixture. When this process is performed under processing conditions exceeding the respective upper limits of the above ranges, the processing time of the prepared sulfide-based solid electrolyte may increase, undesirably deteriorating mass productivity.

The secondarily stirring may be carried out at a rotating speed of about 250 to 300 rpm for about 18 to 36 hr. When this process is performed under processing conditions that fall below the respective lower limits of the above ranges, the prepared sulfide-based solid electrolyte may not be sufficiently synthesized. When this process is performed under processing conditions exceeding the respective upper limits of the above ranges, side reactions may occur, making it impossible to obtain a solid electrolyte having high ionic conductivity.

The sulfide-based solid electrolyte is precipitated by evaporating the solvent admixture (S400). The step of precipitating the sulfide-based solid electrolyte (S400) may be performed by evaporating the solvent admixture through drying in a vacuum at room temperature (15 to 25° C.) to about 80° C. for about 1 hr to 24 hr. When this process is performed under processing conditions that fall below the respective lower limits of the above ranges, the solvent admixture may not be sufficiently evaporated. When this process is performed under processing conditions exceeding the respective upper limits of the above ranges, the sulfide-based solid electrolyte may crack.

The precipitated sulfide-based solid electrolyte may be heat treated (S500). In the step of heat treating the sulfide-based solid electrolyte (S500), the sulfide-based solid electrolyte may have an amorphous structure or an argyrodite-type crystal structure.

For example, when the sulfide-based solid electrolyte has an amorphous structure, the step of heat treating the sulfide-based solid electrolyte (S500) may be performed at a temperature of about 200 to 300° C. for about 1 to 24 hr. When this process is performed under processing conditions that fall below the respective lower limits of the above ranges, the sulfide-based solid electrolyte may not have an amorphous structure. When this process is performed under processing conditions exceeding the respective upper limits of the above ranges, side reactions may occur, making it impossible to precipitate a desired crystal phase.

For example, when the sulfide-based solid electrolyte has an argyrodite-type crystal structure, the step of heat treating the sulfide-based solid electrolyte (S500) may be performed at a temperature of about 300 to 550° C. for about 1 to 48 hr. When this process is performed under processing conditions that fall below the respective lower limits of the above ranges, the sulfide-based solid electrolyte may not have an argyrodite-type crystal structure. When this process is performed under processing conditions exceeding the respective upper limits of the above ranges, side reactions may occur, making it impossible to precipitate a desired crystal phase.

The sulfide-based solid electrolyte may emit an amount of about 0.25 to 0.4 $cm^3/g$ of $H_2S$ gas upon exposure of air. When the amount of gas that is emitted is less than the above lower limit, ionic conductivity may decrease. When the amount thereof exceeds the above upper limit, the chemical stability of the sulfide-based solid electrolyte may decrease.

In the step of heat treating the sulfide-based solid electrolyte (S500), the sulfide-based solid electrolyte may include a metal oxide. The metal oxide may include, for example, $Li_3PO_4$. The sulfide-based solid electrolyte may suitably include the metal oxide, and may thus have low $H_2S$ gas content.

The method of manufacturing the sulfide-based solid electrolyte according to various exemplary embodiments of the present invention may provide a sulfide-based solid electrolyte for an all-solid battery, which has high ionic conductivity and is chemically and electrochemically stable because of the low $H_2S$ gas content thereof, realized through the use of the second polar organic solvent.

EXAMPLE

A better understanding of the present invention will be given through the following examples, which are merely set forth to illustrate, but are not to be construed as limiting the scope of the present invention.

EXAMPLES

Example 1

200 ml of a first polar organic solvent, acetonitrile, was prepared. As a second polar organic solvent, ethanol was prepared, and was added in an amount of 0.025 wt % based on the amount of the starting material, thus forming a solvent admixture. Then, $Li_2S$, $P_2S_5$ and LiCl were dissolved in the solvent admixture, thus forming an electrolyte admixture. The electrolyte admixture was stirred at a temperature of 30° C. for 24 hr, thus synthesizing a sulfide-based solid electrolyte. The synthesized sulfide-based solid electrolyte was primarily stirred at a rotating speed of 100 rpm for 5 min and then secondarily stirred at a rotating speed of 280 rpm for 24 hr. The solvent admixture was evaporated for 12 hr through drying in a vacuum at room temperature, thus precipitating a sulfide-based solid electrolyte. The precipitated sulfide-based solid electrolyte was heat treated at a temperature of 550° C. for 5 hr.

Example 2

The present example was performed in the same manner as in Example 1, with the exception that the solvent admixture was added with 70 mol % of $Li_2S$ and 30 mol % of $P_2S_5$, without the addition of LiCl, and the precipitated sulfide-based solid electrolyte was heat treated at a temperature of 260° C. for 1 hr.

Comparative Example 1

The present example was performed in the same manner as in Example 1, with the exception that the second polar organic solvent was added in an amount of 0.05 wt % based on the amount of the starting material.

Comparative Example 2

The present example was performed in the same manner as in Example 1, with the exception that the second polar organic solvent was added in an amount of 0.1 wt % based on the amount of the starting material.

Comparative Example 3

The present example was performed in the same manner as in Example 1, with the exception that 1-propanol was used as the second polar organic solvent, in lieu of ethanol.

Comparative Example 4

The present example was performed in the same manner as in Example 1, with the exception that isopropyl alcohol was used as the second polar organic solvent, in lieu of ethanol.

Comparative Example 5

The present example was performed in the same manner as in Example 1, with the exception that the second polar organic solvent was not added.

Comparative Example 6

The present example was performed in the same manner as in Example 2, with the exception that the second polar organic solvent was added in an amount of 0.1 wt % based on the amount of the starting material.

Comparative Example 7

The present example was performed in the same manner as in Example 2, with the exception that 1-propanol was used as the second polar organic solvent, in lieu of ethanol.

Comparative Example 8

The present example was performed in the same manner as in Example 2, with the exception that isopropyl alcohol was used as the second polar organic solvent, in lieu of ethanol.

Comparative Example 9

The present example was performed in the same manner as in Example 2, with the exception that the second polar organic solvent was not added.

Measurement of Properties and Measurement Results

1. Determination of Crystal Structure

XRD (X-ray Diffraction Spectroscopy) of the precipitated sulfide-based solid electrolytes of Examples 1 and 2 and Comparative Examples 1 to 9 before and after heat treatment was measured. The results thereof are shown in FIGS. 3A to 3K, and the observed materials are shown in Table 1 below.

TABLE 1

| | Example | | Comparative Example | | | | | | | | |
|---|---|---|---|---|---|---|---|---|---|---|---|
| | 1 | 2 | 1 | 2 | 3 | 4 | 5 | 6 | 7 | 8 | 9 |
| XRD | $Li_6PS_5Cl$ + $Li_2S$ + LiCl + $Li_3PO_4$ | $Li_3PO_4$ | $Li_6PS_5Cl$ + $Li_2S$ + LiCl + $Li_3PO_4$ | $Li_6PS_5Cl$ + $Li_2S$ | $Li_6PS_5Cl$ | | beta-$Li_3PS_4$ | $Li_7P_3S_{11}$ + $Li_4P_2S_6$ | $Li_3PS_4$ | $Li_7P_3S_{11}$ | |

As shown in Table 1, oxide crystal such as $Li_3PO_4$ was contained in Examples 1 and 2. The oxide crystal is capable of decreasing the amount of $H_2S$ gas of the solid electrolyte to thus increase the chemical stability of the solid electrolyte.

2. Measurement of Amount of $H_2S$ Gas

The amount of $H_2S$ emitted upon exposure to air in Examples 1 and 2 and Comparative Examples 1 to 9 was measured. The results thereof are shown in Table 2 below. Also, the results of Example 1 and Comparative Example 6 are shown in FIG. 4A, and the results of Example 2 and Comparative Example 9 are shown in FIG. 4B.

TABLE 2

| | Example | | Comparative Example | | | | | | | | |
|---|---|---|---|---|---|---|---|---|---|---|---|
| | 1 | 2 | 1 | 2 | 3 | 4 | 5 | 6 | 7 | 8 | 9 |
| $H_2S$ gas ($cm^3/g$) | 0.37 | 0.68 | 3.15 | 2.56 | 2.92 | 3.73 | 2.07 | 7.24 | 13.36 | — | 3.79 |

Figure 4A:
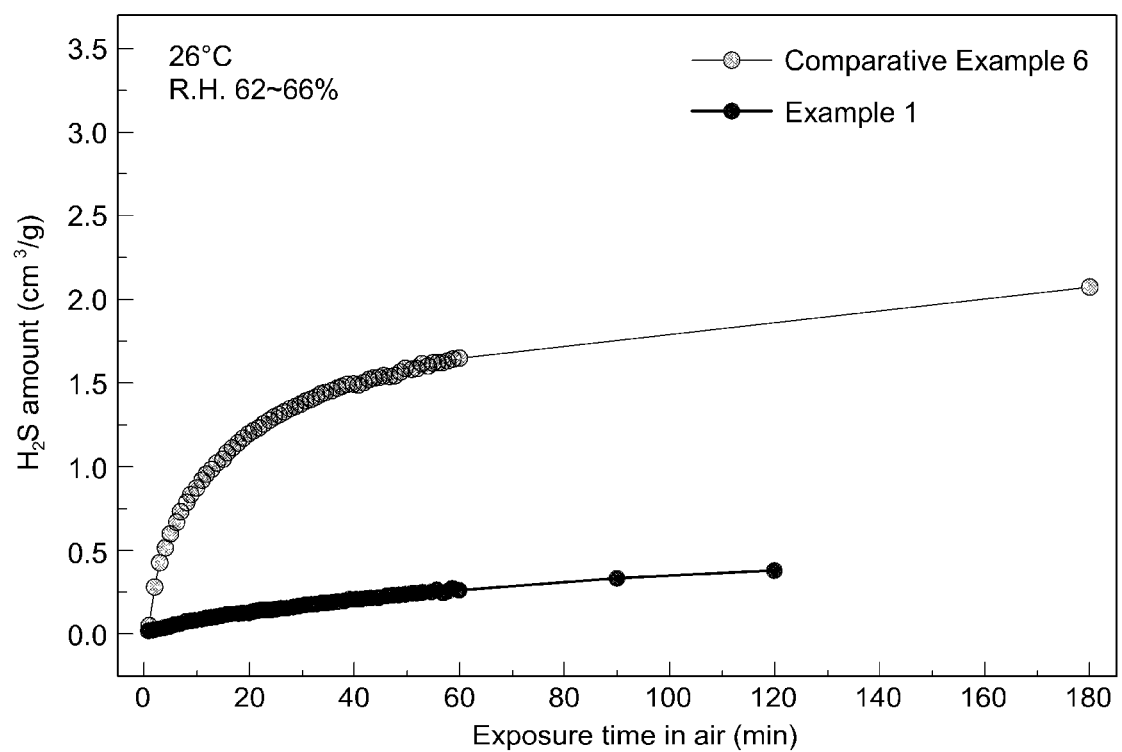
FIG. 4A is a graph showing the amount of $H_2S$ measured upon exposure to air in Example 1 and Comparative Example 6.
Figure 4B:
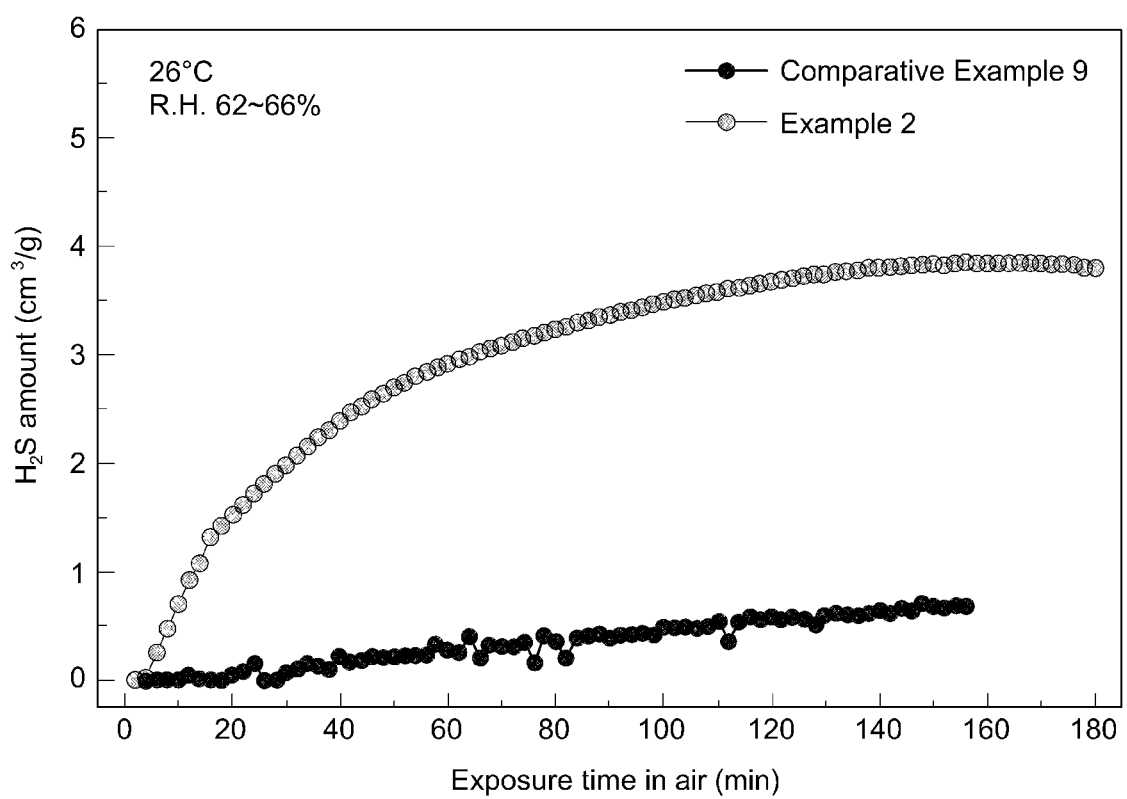
FIG. 4B is a graph showing the amount of $H_2S$ measured upon exposure to air in Example 2 and Comparative Example 9.

As shown in Table 2 and FIGS. 4A and 4B, the amount of $H_2S$ gas was less in Examples 1 and 2 than in Comparative Examples 1 to 9.

3. Measurement of Ionic Conductivity

The ionic conductivity of Examples 1 and 2 and Comparative Examples 1 to 9 was measured. The results are shown in Table 3 below.

TABLE 3

| | Example | | Comparative Example | | | | | | | | |
|---|---|---|---|---|---|---|---|---|---|---|---|
| | 1 | 2 | 1 | 2 | 3 | 4 | 5 | 6 | 7 | 8 | 9 |
| Conductivity (mS/cm) | 0.64 | 0.040 | 0.74 | 1.0 | 0.19 | 1.3 | 1.4 | 0.0053 | 0.063 | 0.015 | 1.14 |

As shown in Tables 2 and 3, Examples 1 and 2 exhibited not only low $H_2S$ gas content but also superior ionic conductivity. On the other hand, Comparative Examples 1 to 9 had high ionic conductivity, but also had high $H_2S$ gas content, and thus exhibited poor stability.

4. Evaluation of Charge/Discharge

Figure 5:
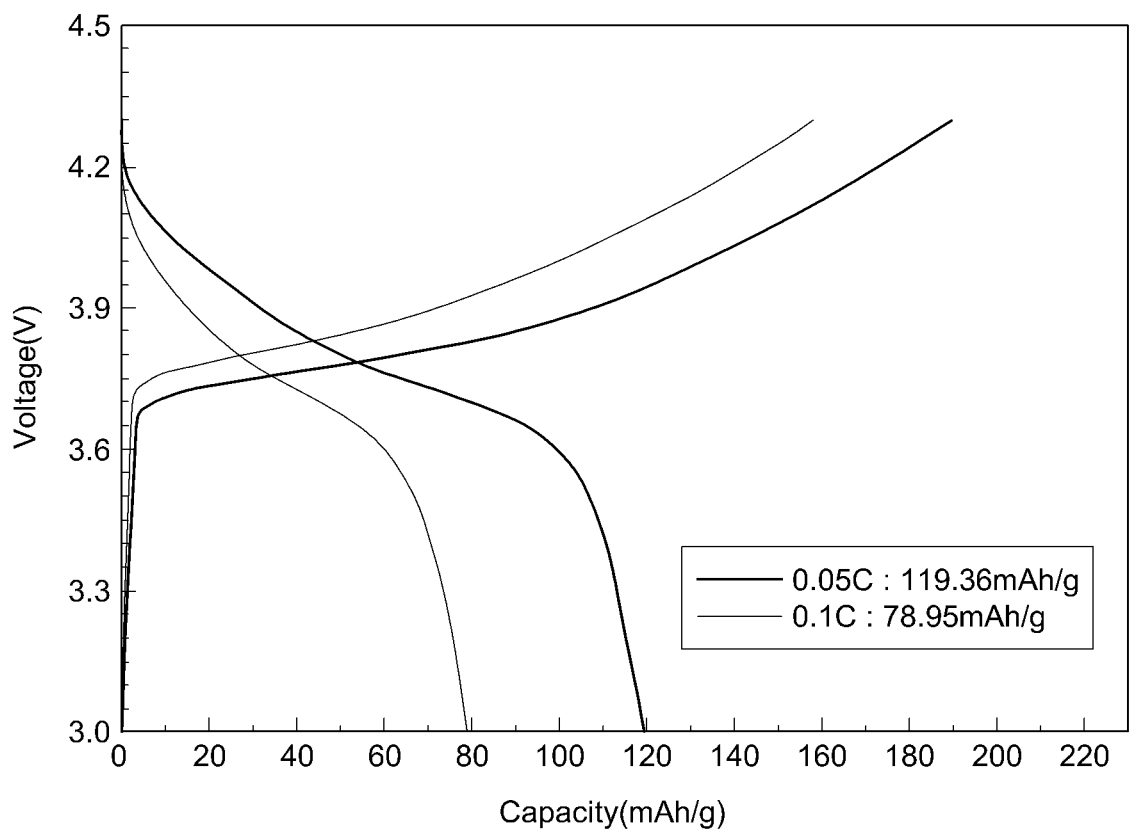
FIG. 5 is a graph showing voltage depending on capacity in Example 1.

An all-solid battery was manufactured using Example 1, and the charge/discharge thereof was evaluated. The results thereof are shown in FIG. 5. With reference to FIG. 5, the charge/discharge capacity thereof can be confirmed to be suitable for use in vehicles.

5. Evaluation of Electrochemical Stability

Figure 6:
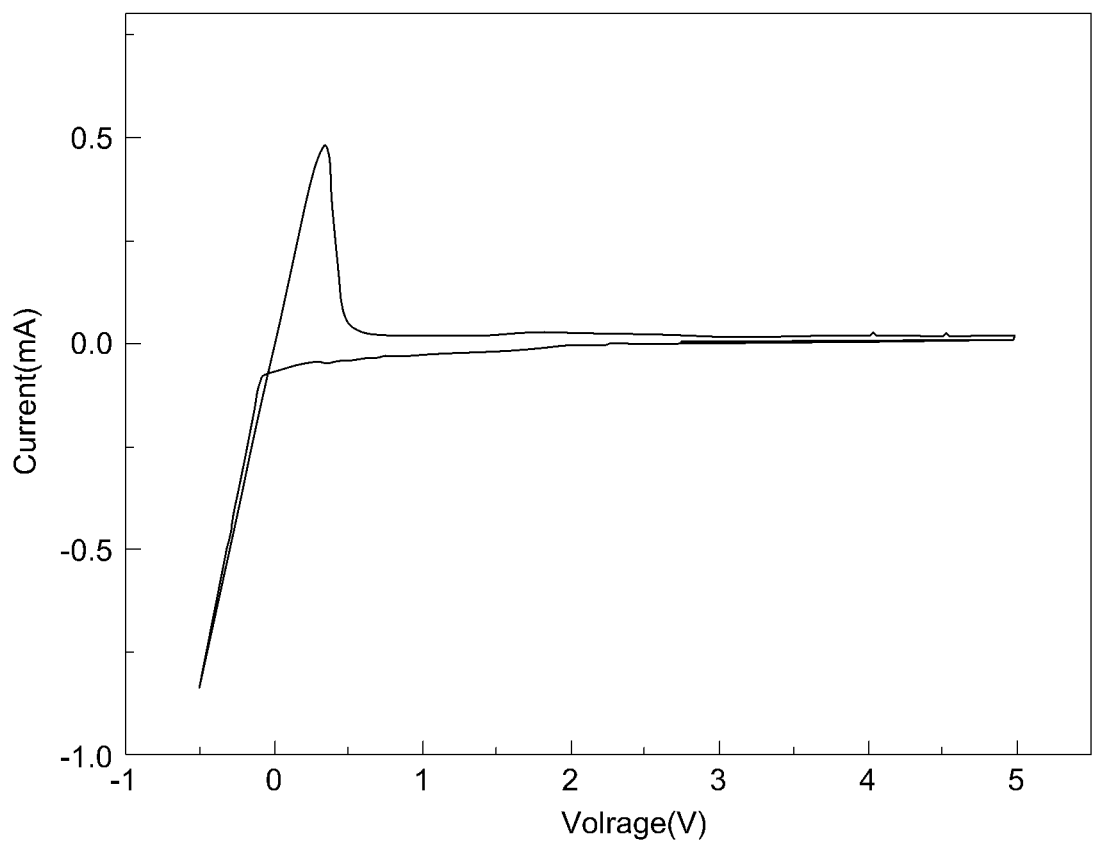
FIG. 6 is a graph showing the results of a cyclic voltammogram test performed on Example 1.

A cyclic voltammogram test was carried out on Example 1. The results thereof are shown in FIG. 6. As the Li interface is more stable, a clean graph without noise appears. Example 1 showed a stable graph shape. Thereby, the electrolyte of Example 1 can be confirmed to exhibit high stability to Li metal.

Although various exemplary embodiments of the present invention have been described with reference to the accompanying drawings, those skilled in the art will appreciate that the present invention may be embodied in other specific forms without changing the technical spirit or essential features thereof. Thus, the embodiments described above should be understood to be non-limiting and illustrative in every way.

What is claimed is:

1. A method of manufacturing a solid electrolyte for an all-solid battery, comprising:
    preparing a solvent admixture comprising a first polar organic solvent and a second polar organic solvent;
    preparing an electrolyte admixture comprising $Li_2S$, $P_2S_5$ and the solvent admixture; and
    preparing a solid electrolyte from the electrolyte admixture;
    wherein, in the forming the solvent admixture, the first polar organic solvent comprises a cyano group, the second polar organic solvent comprises a hydroxyl group, and the first polar organic solvent is different from the second polar organic solvent, and
    the solvent admixture comprises the second polar organic solvent in an amount of about 0.01 to 0.03 parts by weight based on the total weight of the first polar organic solvent.

2. The method of claim 1, further comprising:
    precipitating the solid electrolyte; and
    heat treating the precipitated solid electrolyte.

3. The method of claim 1, wherein the electrolyte admixture is prepared by dissolving the $Li_2S$ and $P_2S_5$ in the solvent admixture.

4. The method of claim 1, wherein the electrolyte admixture is stirred for preparing the solid electrolyte.

5. The method of claim 2, wherein the solid electrolyte is precipitated by evaporating the solvent admixture.

6. The method of claim 1, wherein the solid electrolyte emits an amount of 0.25 to 0.4 $cm^3/g$ of $H_2S$ gas upon exposure to air.

7. The method of claim 2, wherein, in the heat treating the solid electrolyte, the solid electrolyte has an amorphous structure or an argyrodite-type crystal structure.

8. The method of claim 2, wherein, in the heat treating the solid electrolyte, the solid electrolyte comprises a metal oxide.

9. The method of claim 1, wherein the first polar organic solvent comprises acetonitrile.

10. The method of claim 1, wherein the second polar organic solvent comprises one or more selected from the group consisting of methanol, ethanol, and 1-propanol.

11. The method of claim 1, wherein the solvent admixture is prepared by stirring at a rotating speed of about 100 to 200 rpm for about 5 to 60 min.

12. The method of claim 4, wherein the solid electrolyte is prepared by stirring the electrolyte admixture at a temperature of about 30 to 60° C. for about 1 hr to 48 hr.

13. The method of claim 1, further comprising in the preparing the solid electrolyte:
- primarily stirring the electrolyte admixture; and
- secondarily stirring the primarily stirred electrolyte admixture.

14. The method of claim 13, wherein the primarily stirring is performed at a rotating speed of about 100 to 150 rpm for about 5 to 10 min.

15. The method of claim 13, wherein the secondarily stirring is performed at a rotating speed of about 250 to 300 rpm for about 18 to 36 hr.

16. The method of claim 5, wherein the precipitating the solid electrolyte is performed by evaporating the solvent admixture through drying in a vacuum in a temperature range from room temperature to about 80° C. for about 1 hr to 24 hr.

17. A solid electrolyte manufactured by a method of claim 1.

18. An all-solid battery comprising a solid electrolyte of claim 17.

19. A vehicle comprising an all-solid battery of claim 18.

* * * * *